United States Patent
Sakamoto (10) Patent No.: US 12,483,182 B2
(45) Date of Patent: Nov. 25, 2025

(54) DRIVE DEVICE, DRIVE METHOD, AND STORAGE MEDIUM

(71) Applicant: TOYOTA JIDOSHA KABUSHIKI KAISHA, Toyota (JP)

(72) Inventor: Hironobu Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/207,354

(22) Filed: Jun. 8, 2023

(65) Prior Publication Data

US 2024/0039452 A1     Feb. 1, 2024

(30) Foreign Application Priority Data

Jul. 26, 2022 (JP) .................. 2022-118642

(51) Int. Cl.
    *H02P 29/62* (2016.01)
(52) U.S. Cl.
    CPC .................. *H02P 29/62* (2016.02)
(58) Field of Classification Search
    CPC ...................................... H02P 29/62
    See application file for complete search history.

(56) References Cited

U.S. PATENT DOCUMENTS

| | | | |
|---|---|---|---|
| 2015/0224868 A1 | 8/2015 | Makino | |
| 2017/0175612 A1* | 6/2017 | Tokozakura | ............... F01P 7/14 |
| 2020/0398639 A1* | 12/2020 | Maeda | ............... B60H 1/00485 |
| 2023/0014936 A1* | 1/2023 | Wang | ................... B60H 1/3205 |
| 2024/0288060 A1* | 8/2024 | Trübenbach | ........... H02K 11/33 |

FOREIGN PATENT DOCUMENTS

| | | |
|---|---|---|
| JP | 2013-199853 A | 10/2013 |
| JP | 2014-093845 A | 5/2014 |
| JP | 2016-073039 A | 5/2016 |
| JP | 2019-213340 A | 12/2019 |
| JP | 2020-059407 A | 4/2020 |

* cited by examiner

*Primary Examiner* — Zoheb S Imtiaz
(74) *Attorney, Agent, or Firm* — Dinsmore & Shohl LLP (57) ABSTRACT

A drive device is provided. The drive device includes an electric motor, a power control device, an oil circuit that cools the electric motor with oil, a water circuit that cools the power control device with water, a heat exchanger that exchanges heat between the oil circuit and the water circuit, and a control device. The control device drives the power control device for heat generation, when a temperature regarding the oil is equal to or lower than a first threshold value.

10 Claims, 6 Drawing Sheets

DRIVE DEVICE, DRIVE METHOD, AND STORAGE MEDIUM

CROSS-REFERENCE TO RELATED APPLICATION

This application claims priority to Japanese Patent Application No. 2022-118642 filed on Jul. 26, 2022 incorporated herein by reference in its entirety.

BACKGROUND

1. Technical Field

The present disclosure relates to a drive device, a drive method, and a storage medium.

2. Description of Related Art

Conventionally, in a drive device of a vehicle and the like, there is known a technique of cooling or warming up oil lubricating gears of a motor with a water-cooled oil cooler (see, for example, Japanese Unexamined Patent Application Publication No. 2020-059407 (JP 2020-059407 A)).

SUMMARY

However, in the related art, for example, when driving a vehicle or the like that has been stopped in a situation in which the temperature of the surrounding environment is lower than the threshold value, the viscosity of the oil increases. As a result, the agitation loss, the drag loss (no-load loss), and the like increase that occur in parts that require lubrication such as gears, which may result in increase in vibration and deterioration in fuel consumption.

An object of the present disclosure is to provide a technique for further improving the warming-up efficiency when driving a vehicle or the like that has been stopped in a low temperature environment.

A first aspect of the present disclosure provides a drive device. The drive device includes an electric motor, a power control device, an oil circuit that cools the electric motor with oil, a water circuit that cools the power control device with water, a heat exchanger that exchanges heat between the oil circuit and the water circuit, and a control device. The control device drives the power control device for heat generation, when a temperature regarding the oil is equal to or lower than a first threshold value.

A second aspect of the present disclosure provides a drive method, in which a control device for a drive device including an electric motor, a power control device, an oil circuit that cools the electric motor with oil, a water circuit that cools the power control device with water, and a heat exchanger that exchanges heat between the oil circuit and the water circuit, drives the power control device for heat generation, when a temperature regarding the oil is equal to or lower than a first threshold value.

Further, a third aspect of the present disclosure provides a storage medium storing a program. The program causes a computer of a drive device including an electric motor, a power control device, an oil circuit that cools the electric motor with oil, a water circuit that cools the power control device with water, and a heat exchanger that exchanges heat between the oil circuit and the water circuit, to execute a process of driving the power control device for heat generation, when a temperature regarding the oil is equal to or lower than a first threshold value.

According to one aspect, it is possible to further improve the warming-up efficiency when driving a vehicle or the like that has been stopped in a low temperature environment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The principle of the present disclosure will be described with reference to several exemplary embodiments. It should be understood that the embodiments are described for illustrative purposes only, and do not imply any limitation on the scope of the present disclosure, and are intended to assist those skilled in the art in understanding and practicing the present disclosure. The disclosure described herein can be implemented in various ways other than those described below. In the following description and claims, unless otherwise defined, all technical and scientific terms used herein have the same meaning as commonly understood by those skilled in the art to which the present disclosure belongs. Hereinafter, the embodiments of the present disclosure will be described with reference to the drawings.

System Configuration

Figure 1:
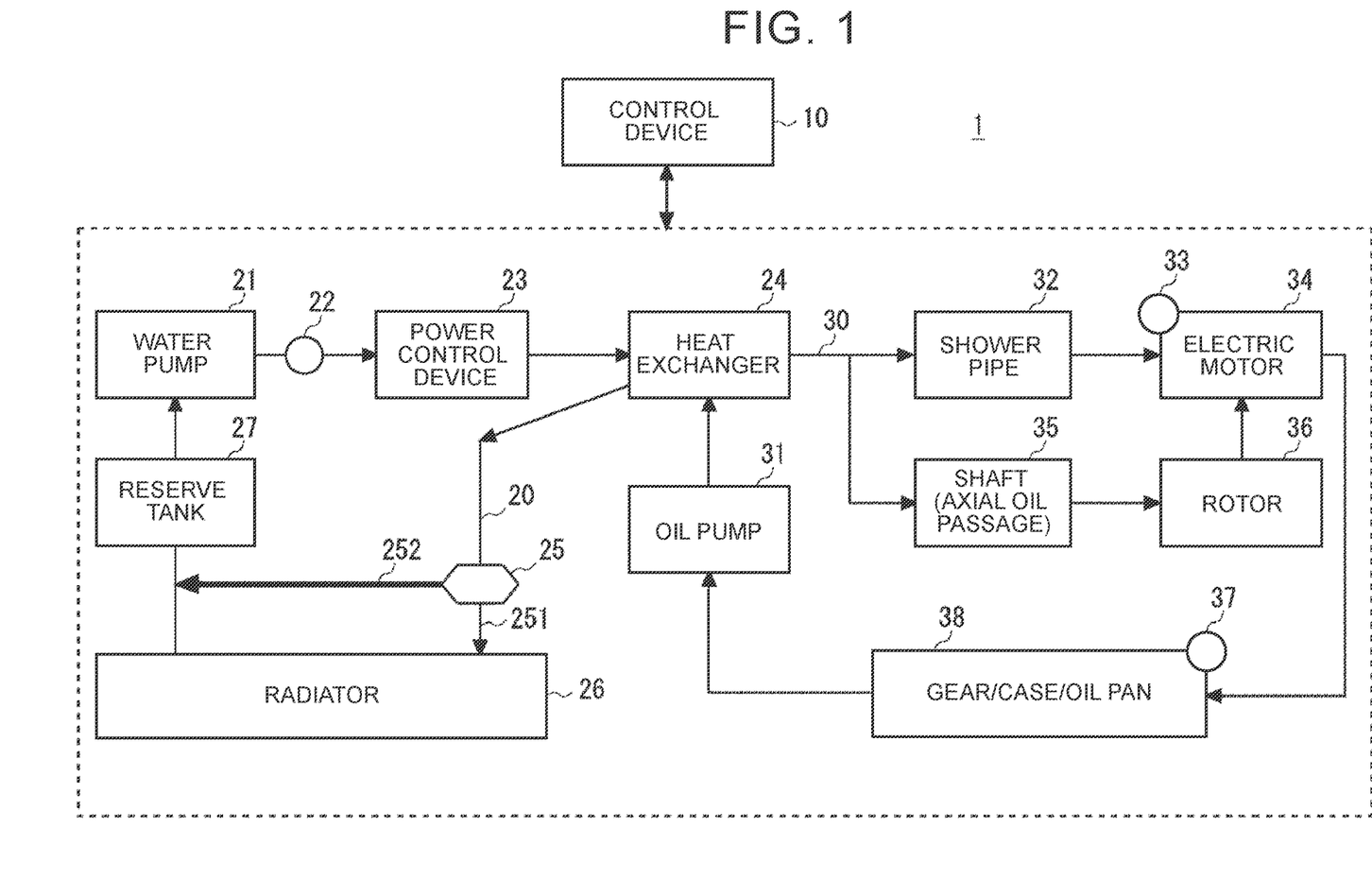
FIG. 1 is a diagram showing a configuration example of a drive device according to an embodiment.

A configuration of a drive device 1 according to an embodiment will be described with reference to FIG. 1. FIG. 1 is a diagram showing a configuration example of the drive device 1 according to the embodiment. Note that the drive device 1 of the present disclosure may be mounted on various pieces of apparatus such as vehicles, construction machines, and airplanes, for example. Examples of the vehicles may include a battery electric vehicle (BEV) in which an engine is not used, a hybrid electric vehicle (HEV) that has two or more power sources, an engine vehicle, and the like.

In the example of FIG. 1, the drive device 1 includes a control device 10, a water circuit 20, a water pump 21, a water temperature sensor 22, a power control device 23, a heat exchanger 24, a switching valve 25, a radiator 26, a reserve tank 27, an oil circuit 30, an oil pump 31, a shower pipe 32, a thermistor 33, an electric motor (motor) 34, a shaft 35, a rotor 36, an oil temperature sensor 37, and a gear/ case/oil pan 38. The number and arrangement of each device are not limited to the example in FIG. 1 as long as there is no contradiction.

The control device 10 is a device that controls each component of the drive device 1. The control device 10 may be referred to as an electronic control unit (ECU) or the like, for example.

As to Water Circuit 20

The water circuit 20 is, for example, a circuit (flow path) through which water flows for cooling the power control device 23 and the like. In the example of FIG. 1, the water circuit 20 includes a flow path 251 (first flow path) in which water circulates through the water pump 21, the water temperature sensor 22, the power control device 23, the heat exchanger 24, the switching valve 25, the radiator 26, and the reserve tank 27 in this order, and a flow path 252 (second flow path) in which water circulates without passing through the radiator 26 compared to the flow path 251.

The water pump 21 is an electric pump for circulating water in the water circuit 20. In the example of FIG. 1, the water pump 21 sucks water that is air-cooled at the radiator 26 through a suction port and discharges it through a discharge port. Water discharged from the water pump 21 cools the power control device 23. In this case, the inverter and the like included in the power control device 23 are cooled by water.

The water temperature sensor 22 is a sensor (temperature gauge) that measures the temperature of water in the water circuit 20. In the example of FIG. 1, the water temperature sensor 22 measures the water temperature at a position between the water pump 21 from which the water is discharged and the power control device 23 to which the water is supplied. Note that the position of the water temperature sensor 22 is not limited to the example in FIG. 1.

The power control device 23 is a power control unit (PCU) for controlling the electric power of a specific device. The power control device 23 may have, for example, an inverter (power conversion circuit) or the like electrically connected to the specific device. The power control device 23 may be, for example, a PCU that controls driving of the electric motor 34.

The heat exchanger 24 is a device that exchanges heat between water in the water circuit 20 and oil (oil, lubrication oil) in the oil circuit 30. Note that the heat exchanger 24 may also be referred to as, for example, a water-cooled oil cooler or the like.

The switching valve 25 is an electric switching valve (split type three-way valve) that switches the flow path of the water in the water circuit 20 between the flow path 251 (an example of the "first flow path") passing through the radiator 26 and the flow path 252 (an example of the "second flow path") not passing through the radiator 26. The radiator 26 is a device that exchanges heat (radiates heat) between the water in the water circuit 20 and the outside air. The reserve tank 27 is a tank for adjusting the amount of water in the water circuit 20.

As to Oil Circuit 30

The oil circuit 30 is, for example, a circuit (flow path) through which oil flows to cool the electric motor 34 and to lubricate each part that needs to be lubricated. In the example of FIG. 1, the oil circuit 30 includes a first flow path in which oil circulates through the oil pump 31, the heat exchanger 24, the shower pipe 32, the electric motor 34, and the gear/case/oil pan 38 in this order, and a second flow path in which oil circulates through the shaft 35 and the rotor 36 in this order instead of the shower pipe 32, compared to the first flow path. The first flow path and the second flow path may be split by, for example, a mixing type three-way valve or the like.

The oil pump 31 is an electric pump for circulating oil in the oil circuit 30. In the example of FIG. 1, the oil pump 31 sucks the oil heated at the gear/case/oil pan 38 from the suction port and discharges it from the discharge port. The oil discharged from the oil pump 31 is cooled or heated by, for example, the heat exchanger 24 to cool or heat the electric motor 34.

The shower pipe 32 is a device that supplies oil to the electric motor 34. The thermistor 33 is a sensor (temperature gauge) that measures the temperature near the electric motor 34.

The electric motor 34 is the power equipment that converts electrical energy into mechanical energy. In the case of the drive device 1 mounted on the HEV, the electric motor 34 may include a plurality of electric motors (motor generator (MG) 1/MG 2). The shaft 35 is, for example, a part that transmits the power of the electric motor 34. The rotor 36 is a part that rotates about its own axis as a rotation axis at the central part of the electric motor 34.

The oil temperature sensor 37 is a sensor (temperature gauge) that measures the temperature of the oil in the oil circuit 30. In the example of FIG. 1, the oil temperature sensor 37 measures the oil temperature at a position between the electric motor 34 through which the oil passes and the gear/case/oil pan 38 to which the oil is supplied. Note that the position of the oil temperature sensor 37 is not limited to the example in FIG. 1.

The gear/case/oil pan 38 is a device including a gear (transmission, gearbox), a case, and an oil pan. The gear, the case, and the oil pan may be formed as an integral component, or may be formed as a combination of separate components, etc. The oil pan may be, for example, an enclosure (weir) that suppresses the outflow of oil and has the function of keeping back oil to a certain amount.

Configuration of Control Device 10

Figure 2:
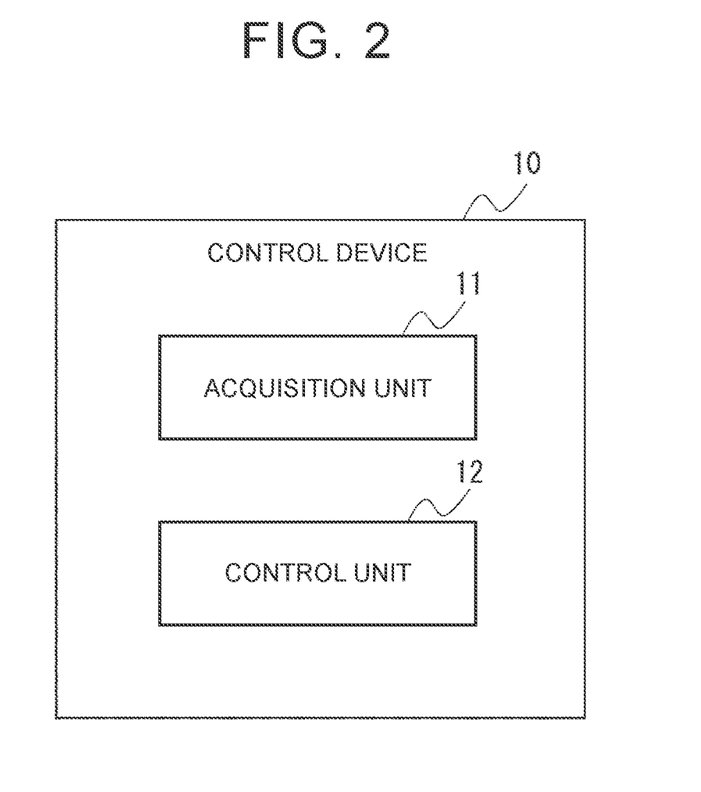
FIG. 2 is a diagram showing an example of a configuration of an information processing device according to the embodiment.

A configuration of the control device 10 according to the embodiment will be described with reference to FIG. 2. FIG. 2 is a diagram showing an example of a configuration of the control device 10 according to the embodiment. In the example of FIG. 2, the control device 10 includes an acquisition unit 11 and a control unit 12. Each of the components may be realized by cooperation of one or more programs installed in the control device 10, and hardware such as the processor of the control device 10 and memory.

The acquisition unit 11 acquires various types of information from a storage unit inside the control device 10 or an external device (for example, another ECU). The acquisition unit 11 acquires information of temperatures measured by the water temperature sensor 22, the thermistor 33, and the oil temperature sensor 37, for example. The control unit 12 controls each component of the drive device 1 based on the information acquired by the acquisition unit 11.

Process

Figure 3:
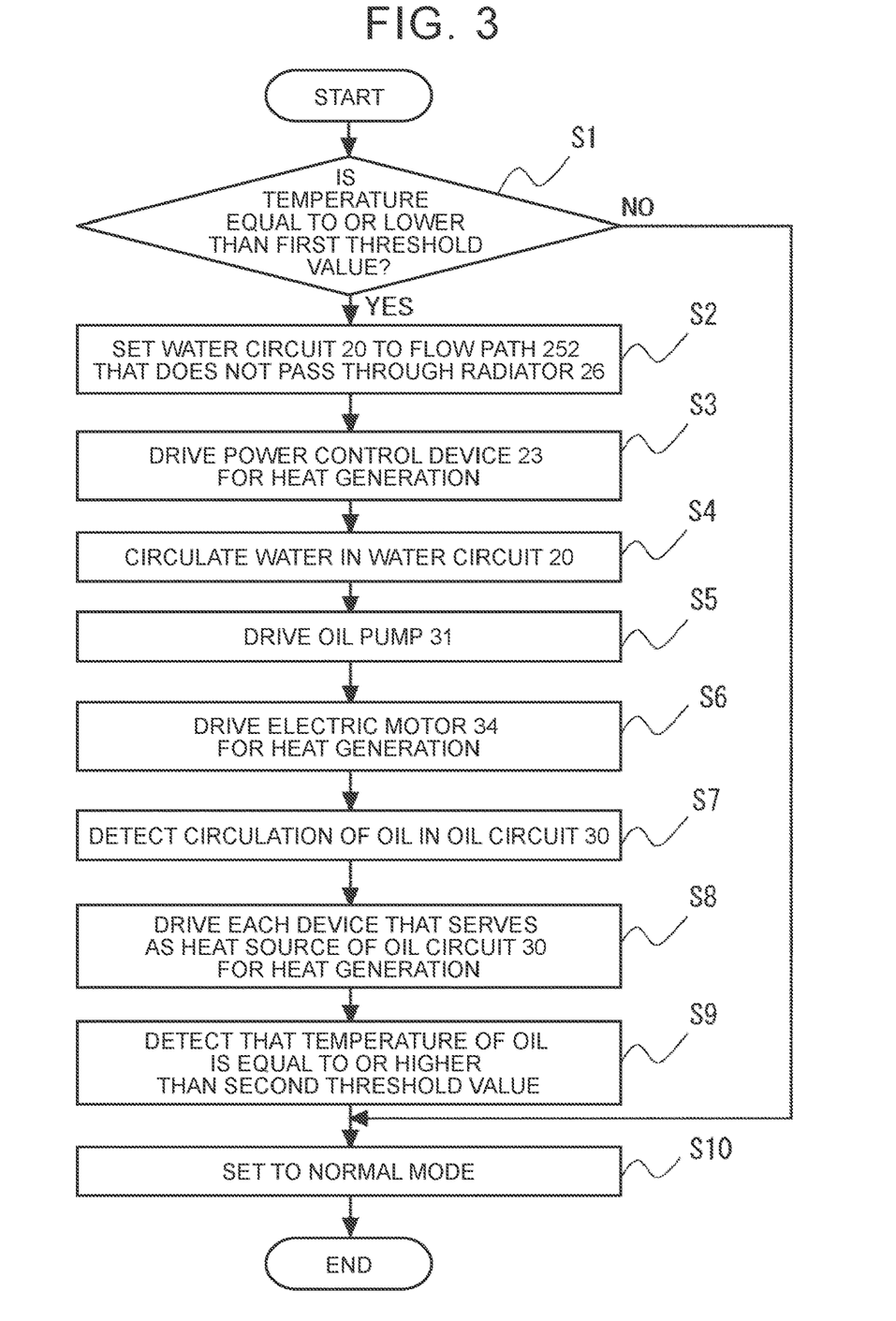
FIG. 3 is a flowchart showing an example of an activation process of a control device according to the embodiment.
Figure 4:
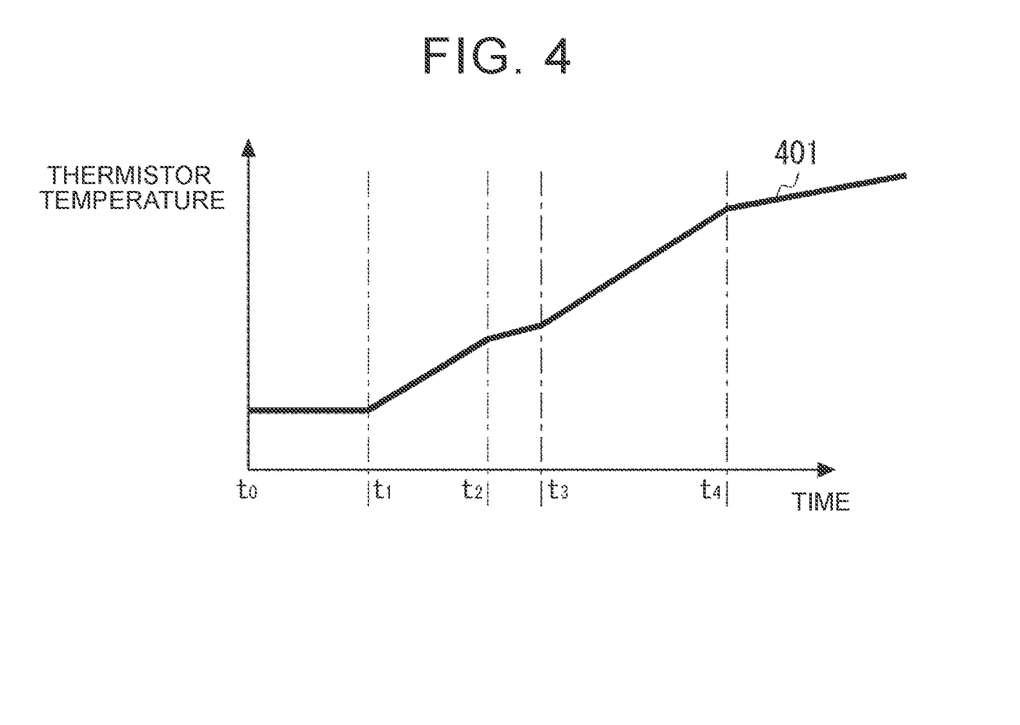
FIG. 4 is a diagram showing an example of transition of a temperature (thermistor temperature) measured by a thermistor according to the embodiment.
Figure 5:
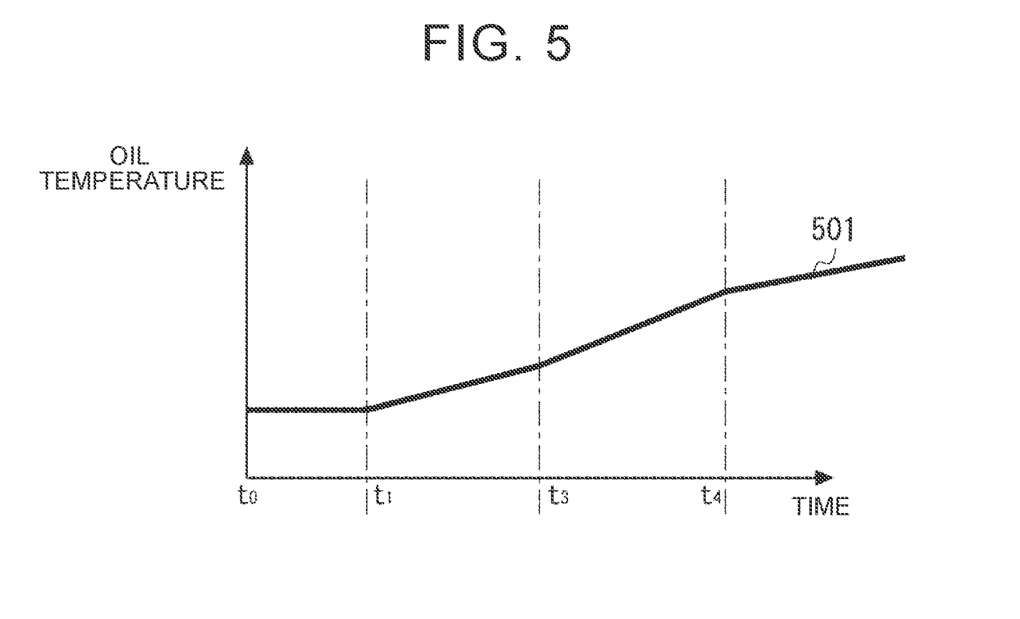
FIG. 5 is a diagram showing an example of transition of an oil temperature measured by an oil temperature sensor according to the embodiment.
Figure 6:
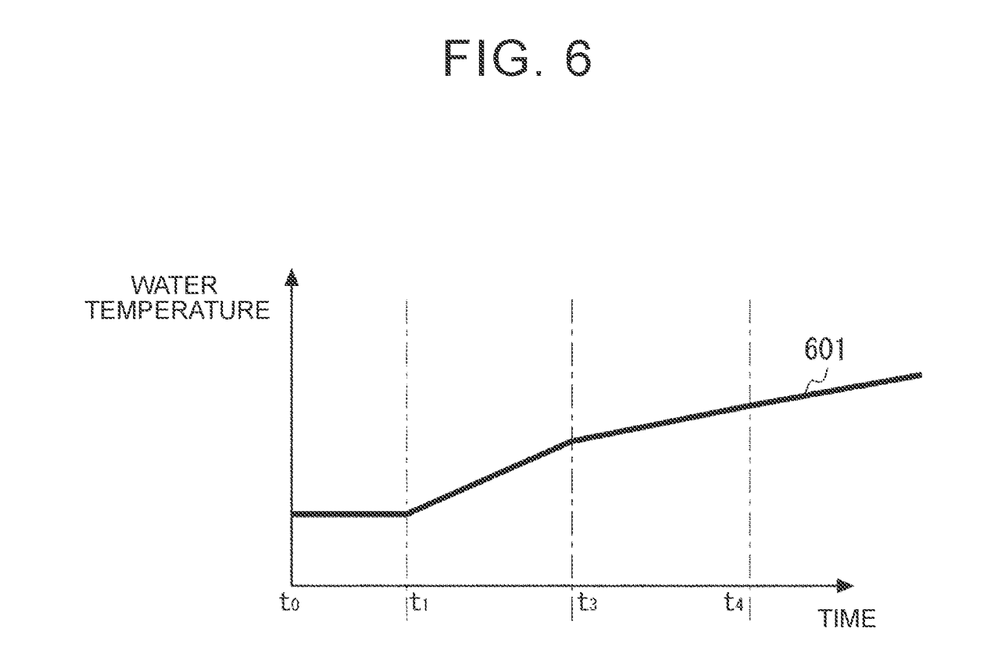
FIG. 6 is a diagram showing an example of transition of a water temperature measured by a water temperature sensor according to the embodiment.

Next, an example of an activation process of the control device 10 according to the embodiment will be described with reference to FIGS. 3 to 6. FIG. 3 is a flowchart showing an example of the activation process of the control device 10 according to the embodiment. FIG. 4 is a diagram showing an example of transition of a temperature (thermistor temperature) measured by the thermistor 33 according to the embodiment. FIG. 5 is a diagram showing an example of transition of an oil temperature measured by the oil temperature sensor 37 according to the embodiment. FIG. 6 is a diagram showing an example of transition of a water temperature measured by the water temperature sensor 22 according to the embodiment.

The following processes may be executed, for example, when the power source of a piece of apparatus (for example, a vehicle or the like) on which the drive device 1 is mounted is activated (turned on) by a user. The order of the following processes may be changed as appropriate as long as there is no contradiction. For example, the order of the processes from step S2 to step S6 is an example, and the processes may be executed in a different order, or may be executed simultaneously (in parallel).

In step S1, the control device 10 determines whether the temperature regarding the oil in the oil circuit 30 is equal to or lower than a first threshold value. Here, the control device 10 may, for example, determine whether the temperature of the oil temperature sensor 37 is equal to or lower than a threshold value. The control device 10 may determine whether the temperature measured by the water temperature sensor 22 or a sensor that measures the outside air temperature is equal to or lower than a threshold value. This is because, for example, in a case where a vehicle or the like on which the drive device 1 is mounted is stopped in a cold region, when the outside air temperature or the like is equal to or lower than a specific temperature, the possibility that the temperature of the oil in the oil circuit 30 is equal to or lower than the threshold value is considered to be high.

When the temperature regarding the oil in the oil circuit 30 is not equal to or lower than the first threshold value (NO in step S1), the process proceeds to step S10, which will be described later. On the other hand, when the temperature regarding the oil in the oil circuit 30 is equal to or lower than the first threshold value (YES in step S1), the control device 10 controls the switching valve 25 to set the water circuit 20 to the flow path 252 that does not pass through the radiator 26 (step S2). As a result, when water is circulated in the water circuit 20, it is possible to suppress the heat from being radiated from the radiator 26 to the atmosphere, so that warm-up can be performed more appropriately.

Subsequently, the control device 10 drives (forcibly drives) the power control device 23 for heat generation (step S3). Here, the control device 10 controls the power control device 23 to generate heat by causing a current to flow in the circuit inside the power control device 23. The control device 10 may determine the magnitude (amperes) of the current to be passed through the circuit inside the power control device 23 based on at least one of the water temperature of the water circuit 20 and the remaining battery level of the drive device 1. In this case, the control device 10 may determine the magnitude of the current to be larger as the water temperature of the water circuit 20 is lower. As a result, for example, the water temperature can be raised more quickly while saving electric power. Further, the control device 10 may determine the magnitude of the current to be larger as the remaining battery level of the drive device 1 increases. As a result, for example, when the remaining battery level is low, more electric power can be saved.

Subsequently, the control device 10 causes the water pump 21 to circulate the water in the water circuit 20 (step S4). Thereby, heat is supplied from the water circuit 20 to the oil circuit 30 via the heat exchanger 24.

Subsequently, the control device 10 drives the oil pump 31 (step S5). As a result, the oil in the oil circuit 30 is circulated when the oil is not hardened due to the low temperature. In addition, since heat is supplied from the water circuit 20 to the oil circuit 30 via the heat exchanger 24, the oil pump 31 can gradually discharge the oil even when the oil is hardened due to the low temperature.

Subsequently, the control device 10 drives (forcibly drives) the electric motor 34 for heat generation (step S6). Here, for example, the control device 10 may control the power control device 23 to drive the electric motor 34. In this case, the oil around the electric motor 34 is melted and liquefied. However, when part of the oil in the oil circuit 30 is hardened due to the low temperature, the oil is not circulated. Therefore, the control device 10 may determine (adjust or change) the electric power value for driving the electric motor 34 in accordance with the temperature measured by the thermistor 33 at each point in time so that the temperature of the electric motor 34 does not become too high. Further, the control device 10 may determine (adjust or change) the electric power value for driving the electric motor 34 so that the rotation speed of the electric motor is the predetermined rotation speed with which the degree of vibration of the vehicle or the like is within a predetermined allowable range.

Subsequently, the control device 10 detects that circulation of the oil in the oil circuit 30 has started (step S7). Here, the control device 10 may detect that the circulation of the oil in the oil circuit 30 has started, for example, based on the degree of change in temperature measured by the thermistor 33 at each point in time. In this case, the control device 10 may determine that the circulation of the oil in the oil circuit 30 has started when, for example, the rate of increase in temperature measured by the thermistor 33 at each point in time is reduced by a threshold value or more within a predetermined period of time. This is because while the oil is not circulating, the temperature measured by the thermistor 33 continues to rise as the electric motor 34 is driven for the preliminary heat generation, and thereafter, when the oil pump 31 is able to discharge the oil with the heat supplied from the water circuit 20 to the oil circuit 30 via the heat exchanger 24, the rate of increase in temperature measured by the thermistor 33 decreases rapidly because the oil circulates.

Subsequently, the control device 10 drives (forcibly drives) each device that serves as a heat source of the oil circuit 30 for heat generation (step S8). Each device that serves as a heat source of the oil circuit 30 may include, for example, the electric motor 34, the gears of the gear/case/oil pan 38, and the like. Since the oil in the oil circuit 30 is thus circulated, the heat from each heat source can be recovered.

Here, the control device 10 may stop driving for heat generation of the power control device 23, which has been started in step S3. This is because the efficiency of heat generation (the amount of heat generated per unit power consumption) is higher in the electric motor 34 and the gears, for example, than in the power control device 23. Thus, electric power can be saved.

Subsequently, the control device 10 detects that the temperature of the oil in the oil circuit 30 is equal to or higher than a second threshold value that is higher than the first threshold value (step S9). Here, the control device 10 may, for example, determine whether the temperature of the oil temperature sensor 37 is equal to or higher than the second threshold value.

Subsequently, the control device 10 terminates the warm-up mode of each component of the drive device 1, and sets each component of the drive device 1 to the normal mode (step S10). Here, the control device 10 stops driving for heat generation of each device that serves as a heat source of the oil circuit 30. Further, the control device 10 may control the switching valve 25 to set the water circuit 20 to the flow path 251 passing through the radiator 26.

FIGS. 4 to 6 show examples of a case in which the processes from step S2 to step S6 in FIG. 3 are executed in parallel. FIG. 4 shows an example of transition 401 of the temperature measured by the thermistor 33. FIG. 5 shows an example of transition 501 of the temperature measured by the oil temperature sensor 37. FIG. 6 shows an example of transition 601 of the temperature measured by the water temperature sensor 22.

In the examples of FIGS. 4 to 6, the power source of the vehicle or the like is activated by the user at time $t_0$. After that, at time $t_1$, the processes from step S2 to step S6 in FIG. 3 are started in parallel. Therefore, the temperature (thermistor temperature) measured by the thermistor 33, the oil temperature measured by the oil temperature sensor 37, and the water temperature measured by the water temperature sensor 22 are starting to rise.

After that, at time $t_2$, the oil pump 31 successfully discharges oil, and the circulation of the oil in the oil circuit 30 is started. Therefore, the rate of increase in the thermistor temperature is rapidly reduced.

After that, at time $t_3$, the process of step S8 in FIG. 3 is started. Therefore, the rate of increase in oil temperature increases compared to that in the period of time from time $t_1$ to $t_3$. In addition, since the power control device 23 is not driven for heat generation, the rate of increase in the water temperature is reduced compared to that in the period of time from time $t_1$ to $t_3$. After that, at time $t_4$, the process of step S10 in FIG. 3 is started.

Example of Case in which Accelerator Operation Is Performed Before Circulation of Oil in Oil Circuit 30 Is Started In a case in which an accelerator operation (movement operation, driving start operation) is performed by the user before the circulation of the oil in the oil circuit 30 is started, when the electric motor 34 is driven at a rotation speed corresponding to an accelerator operation amount, vibration of the vehicle or the like may occur. Therefore, the control device 10 may drive the electric motor 34 at a predetermined rotation speed at which the degree of vibration falls within a predetermined allowable range, when the accelerator operation is performed before the circulation of the oil is started.

In this case, when the accelerator operation is performed before the start of the circulation of the oil in the oil circuit 30 is detected by the process of step S7 in FIG. 3, the control device 10 may drive the electric motor 34, similarly to the driving process for the preliminary heat generation in step S6 in FIG. 3. The control device 10 may determine (adjust or change) the electric power value for driving the electric motor 34 so that the rotation speed of the electric motor is the predetermined rotation speed with which the degree of vibration of the vehicle or the like is within a predetermined allowable range. The control device 10 may, for example, determine (adjust or change) the electric power value for driving the electric motor 34 in accordance with the temperature measured by the thermistor 33 at each point in time so that the temperature of the electric motor 34 does not become too high.

Further, in this case, the control device 10 may drive the electric motor 34 similarly to the driving process for the preliminary heat generation in step S6 of FIG. 3, only when the accelerator operation amount is equal to or less than the threshold value. As a result, for example, while the user is driving the vehicle or the like at low speed, vibration can be reduced. Further, when the accelerator operation amount exceeds the threshold value due to, for example, the user depressing the accelerator pedal for collision avoidance or the like, the electric motor 34 can be driven at the rotation speed corresponding to the accelerator operation amount.

Others

For example, as the number of electrified vehicles increases, it is necessary to develop vehicles that can be used in various destinations. In such a situation, it is necessary that the electric motor (motor) can be used properly in a low temperature environment as well as it has thermal reliability.

Viscosity of lubrication oil for vehicles or the like increases as the temperature decreases. Therefore, in a low temperature environment, it is desirable to warm the oil when starting the vehicle after being stopped for a while. In this case, it may be possible to use the heat of the engine or the heater for cold regions to initially warm up the electric motor (when starting the vehicle after it has been stopped for a while). However, it is also desirable that initial warm up of the electric motor can be properly performed even in a vehicle that has neither the engine nor the heater for cold regions, a vehicle that has the electric motor in a position distant from the engine and the heater for cold regions, or the like. Examples of the vehicle that does not have an engine include BEVs. Examples of the vehicle having an electric motor in a position distant from the engine include a front-engine vehicle that is provided with an electric motor at the rear portion of the vehicle in order to improve traveling performance.

According to the present disclosure, not being limited to the vehicle or the like that has neither of an engine nor a heater for cold regions, a vehicle or the like that has an engine and a heater for cold regions can also be warmed up at a higher speed, for example.

Hardware Configuration of Control Device 10

Figure 7:
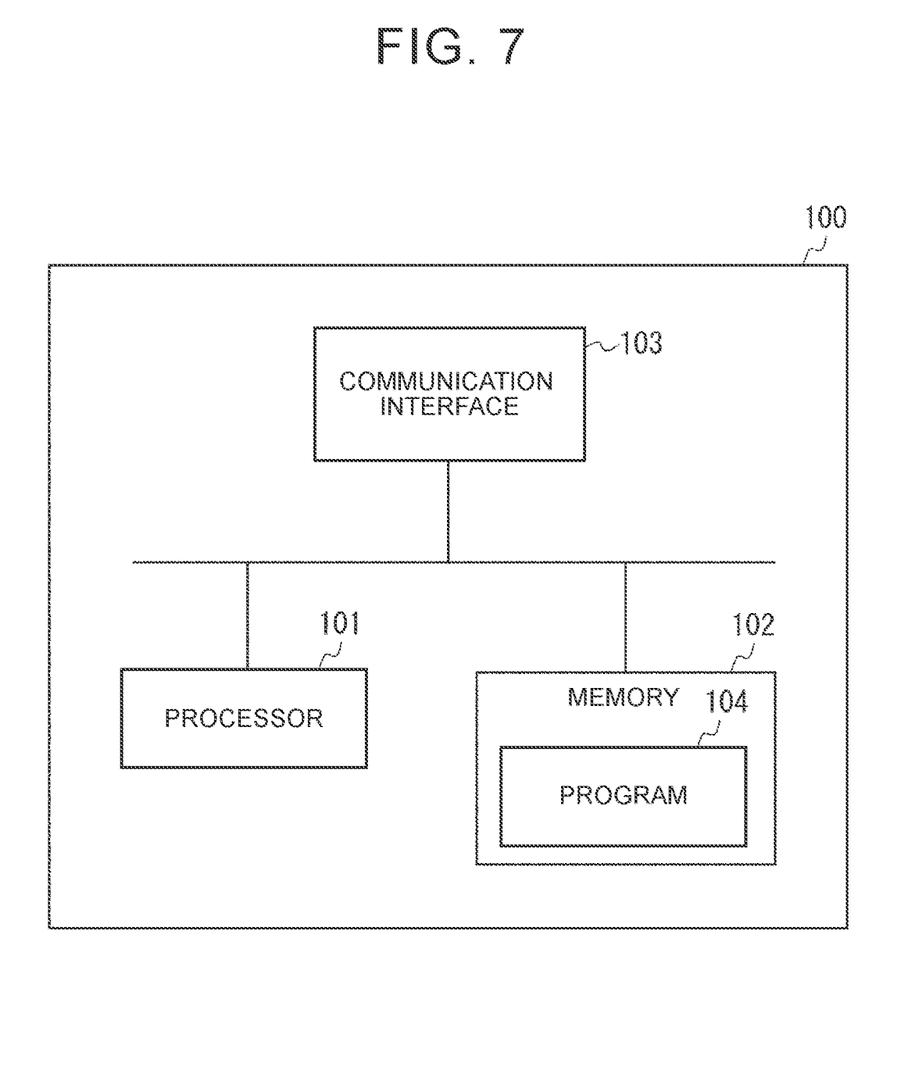
FIG. 7 is a diagram showing a hardware configuration example of the control device according to the embodiment.

FIG. 7 is a diagram showing a hardware configuration example of the control device 10 according to the embodiment. In the example of FIG. 7, the control device 10 (computer 100) includes a processor 101, a memory 102, and a communication interface 103. These components may be connected to each other by a bus or the like. The memory 102 stores at least a part of the program 104. The communication interface 103 includes an interface needed to communicate with other network elements.

When the program 104 is executed by cooperation of the processor 101, the memory 102, etc., the computer 100 performs at least a part of the processes of the embodiments of the present disclosure. The memory 102 may be of any type suitable for a local technology network. The memory 102 may be, as a non-limiting example, a non-transitory computer-readable storage medium. Also, the memory 102 may be implemented using any suitable data storage technology, such as a semiconductor-based memory device, a magnetic memory device and system, an optical memory device and system, a fixed and removable memory, and the like. Although only one memory 102 is shown in the computer 100, there may be several physically different memory modules in the computer 100. The processor 101 may be of any type. The processor 101 may include one or more of a general purpose computer, a special purpose computer, a microprocessor, a digital signal processor (DSP), and a processor based on a multi-core processor architecture as a non-limiting example. The computer 100 may include a plurality of processors, such as an application specific integrated circuit chip that is temporally dependent on a clock that synchronizes the main processor.

The embodiments of the present disclosure may be implemented in hardware or dedicated circuit, software, logic, or any combination thereof. Some modes may be implemented in hardware, while other modes may be implemented in firmware or software, which may be executed by a controller, a microprocessor or other computing devices.

The present disclosure also provides at least one computer program product tangibly stored in a non-transitory computer-readable storage medium. The computer program product includes computer-executable instructions, such as instructions included in program modules, to be executed on a device on a target real or virtual processor to perform the processes or the method of the present disclosure. The program modules include routines, programs, libraries, objects, classes, components, data structures, etc. that perform specific tasks or implement specific abstract data types. The functionality of the program modules may be combined or split between program modules as desired in various embodiments. Machine-executable instructions for program modules may be executed in a local or a distributed device. In a distributed device, program modules can be located in both local and remote storage media.

Program code for executing the method of the present disclosure may be written in any combination of one or more programming languages. The program code is provided to a processor or a controller of a general purpose computer, a special purpose computer, or other programmable data processing devices. When the program code is executed by the processor or the controller, the functions/operations in the flowchart and/or an implemented block diagram are performed. The program code is executed entirely on a machine, as a stand-alone software package, partly on a machine, partly on a remote machine, or entirely on a remote machine or a server.

The program can be stored using various types of non-transitory computer-readable media and provided to the computer. The non-transitory computer-readable media include various types of tangible recording media. Examples of the non-transitory computer-readable media include magnetic recording media, magneto-optical recording media, optical disc media, semiconductor memories, and the like. The magnetic recording media include, for example, a flexible disk, a magnetic tape, a hard disk drive, and the like. The magneto-optical recording media include, for example, a magneto-optical disk and the like. The optical disc media include, for example, a Blu-ray disc, a compact disc read-only memory (CD-ROM), a compact disc recordable (CD-R), a compact disc rewritable (CD-RW), and the like. The semiconductor memories include, for example, a solid state drive, a mask ROM, a programmable ROM (PROM), an erasable PROM (EPROM), a flash ROM, a random access memory (RAM), and the like. The program may also be provided to the computer by various types of transitory computer-readable media. Examples of the transitory computer-readable media include an electrical signal, an optical signal, and an electromagnetic wave. The transitory computer-readable media can provide the program to the computer via a wired communication path, such as an electric wire and an optical fiber, or a wireless communication path.

Modification

The control device 10 may be a device contained in one housing, but the control device 10 of the present disclosure is not limited to this. Each component of the control device 10 may be realized by cloud computing constituted by one or more computers, for example. Also, at least a part of the processes of the control device 10 may be executed by the power control device 23 or the like. The control device 10 may be a device integrated with the power control device 23 and the like. Such control devices are also included in the examples of the "control device" of the present disclosure.

It should be noted that the present disclosure is not limited to the above embodiments, and can be modified as appropriate without departing from the spirit and scope of the disclosure.

What is claimed is:
1. A drive device comprising:
an electric motor;
a power control device;
an oil circuit that cools the electric motor with oil;
a water circuit that cools the power control device with water;
a heat exchanger that exchanges heat between the oil circuit and the water circuit; and
a control device, wherein the control device drives the power control device for heat generation, when a temperature regarding the oil is equal to or lower than a first threshold value,
wherein the water circuit is able to be switched by a switching valve between a first flow path passing through a radiator that causes heat to radiate from water in the water circuit and a second flow path not passing through the radiator; and
wherein the control device sets the water circuit to the second flow path by the switching valve, when the temperature regarding the oil is equal to or lower than the first threshold value.

2. The drive device according to claim 1, wherein the control device stops driving for heat generation of the electric motor and switches the water circuit to the first flow path by the switching valve, when the temperature regarding the oil is equal to or higher than a second threshold value that is higher than the first threshold value.

3. The drive device according to claim 1, wherein the control device drives the electric motor for heat generation, when the oil is circulating in the oil circuit.

4. The drive device according to claim 3, wherein the control device stops driving for heat generation of the power control device, when the oil is circulating in the oil circuit.

5. The drive device according to claim 1, wherein the control device drives the electric motor at a predetermined rotation speed, when accelerator operation is performed before circulation of the oil is started in the oil circuit.

6. A drive method, wherein a control device for a drive device including
an electric motor,
a power control device,
an oil circuit that cools the electric motor with oil,
a water circuit that cools the power control device with water, and a heat exchanger that exchanges heat between the oil circuit and the water circuit, drives the power control device for heat generation, when a temperature regarding the oil is equal to or lower than a first threshold value, wherein the water circuit is able to be switched by a switching valve between a first flow path passing through a radiator that causes heat to radiate from water in the water circuit and a second flow path not passing through the radiator; and wherein the control device sets the water circuit to the second flow path by the switching valve, when the temperature regarding the oil is equal to or lower than the first threshold value.

7. A non-transitory storage medium storing a program that causes a computer of a drive device including an electric motor, a power control device, an oil circuit that cools the electric motor with oil, a water circuit that cools the power control device with water, and a heat exchanger that exchanges heat between the oil circuit and the water circuit, to execute a process of driving the power control device for heat generation, when a temperature regarding the oil is equal to or lower than a first threshold value, wherein the water circuit is able to be switched by a switching valve between a first flow path passing through a radiator that causes heat to radiate from water in the water circuit and a second flow path not passing through the radiator; and wherein the control device sets the water circuit to the second flow path by the switching valve, when the temperature regarding the oil is equal to or lower than the first threshold value.

8. The drive device according to claim 1, wherein the control device drives the power control device for heat generation by causing an electrical current to flow inside the power control device.

9. The drive method according to claim 6, wherein driving the power control device for heat generation includes causing an electrical current to flow inside the power control device.

10. The non-transitory storage medium according to claim 7, wherein driving the power control device for heat generation includes causing an electrical current to flow inside the power control device.

* * * * *